May 14, 1929.      G. CHRISTENSON      1,712,603
RECESSED PACKING
Filed March 30, 1927
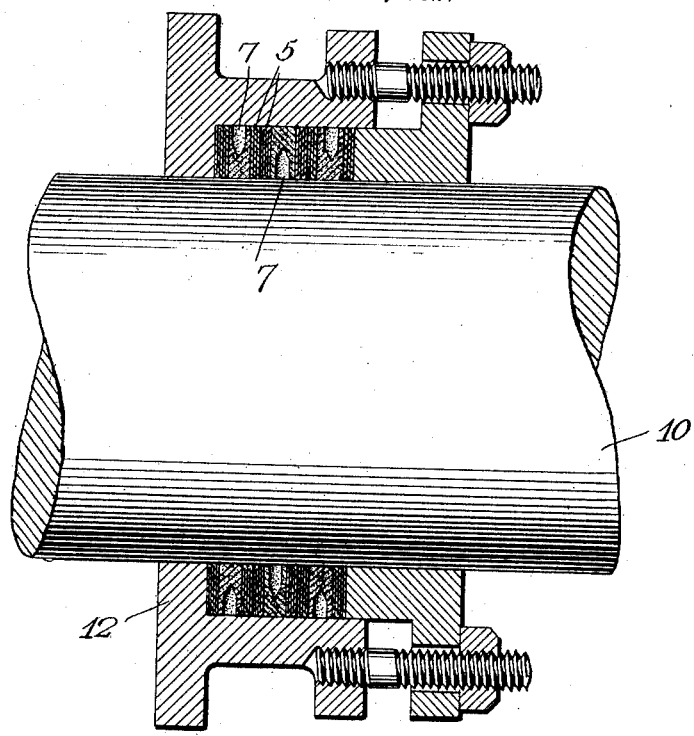
Fig. 1.
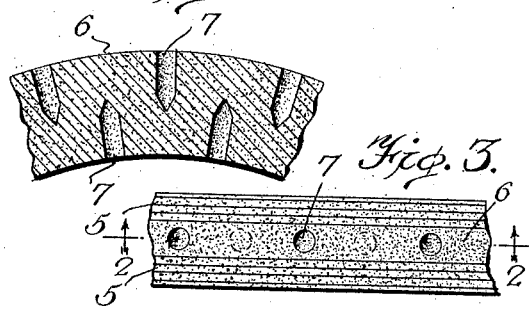
Fig. 2.
Fig. 3.
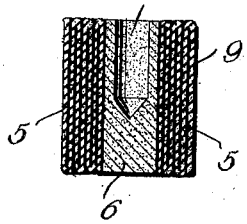
Fig. 4.
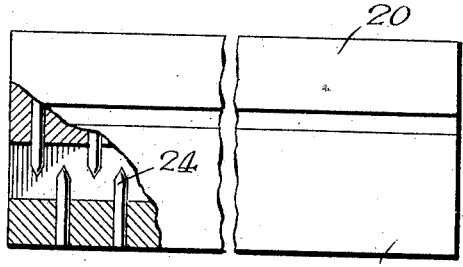
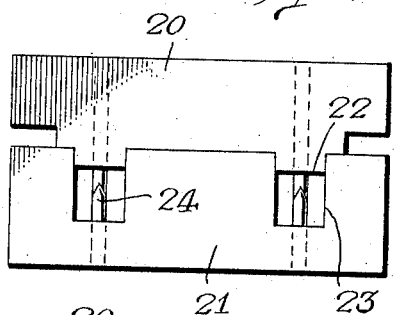
Fig. 5.
Fig. 6.
Inventor
George Christenson
By Roberts Cushman + Woodbury.
Attorneys Patented May 14, 1929.

1,712,603

UNITED STATES PATENT OFFICE.

GEORGE CHRISTENSON, OF NORTH PLAINFIELD, NEW JERSEY.

RECESSED PACKING.

Application filed March 30, 1927. Serial No. 179,519.

This invention relates to an improved type of packing for piston rods, plungers and for various relatively moving mechanical parts. This packing is adapted to maintain a leak-proof joint under varying pressure and temperature conditions without danger of binding or excessive wear; it may be easily lubricated, and permits large differences in pressure at opposite sides of the packing with less "breathing" effect than normally takes place in yieldable packings.

For these purposes, this invention provides a unitary composite packing formed of laminations of material, one of these laminations being somewhat yieldable and having independent, unconnected recesses therein which are so disposed as to be located at the inner and outer faces of the packing. Other laminations of the material upon either side of the yieldable portion thereof are reinforced by fabric and are therefore less yieldable and pliable. Preferably the recesses upon opposite faces of the packing are so distributed that the yieldable portion of the packing is adapted readily to permit expansion and contraction of the packing under changes in temperature, without materially affecting the comparative rigidity which resides in each of the adjoining laminations of material. Preferably, a portion of the packing, such as the lamination which is recessed, is impregnated with material which provides the packing with self-lubricating qualities; for example, the intermediate lamination may be of rubber or rubber substitute mixed with graphite.

The above and further objects and advantages of the invention will be apparent to those skilled in the art upon a reading of the subjoined description and claims in conjunction with the accompanying drawings, in which:

Fig. 1 is a central sectional view of a stuffing box in which the improved form of packing is located;

Fig. 2 is a section on line 2—2 of Fig. 3;

Fig. 3 is an elevational detail of a portion of the packing;

Fig. 4 is an enlarged cross-sectional view of the same; and

Figs. 5 and 6 are end and side elevations of the die used in making the form of packing illustrated in the other figures of the drawings.

Packing of the form exemplified in the accompanying drawings is preferably formed of outer laminations 5 consisting of fabric plies 9 suitably compressed and adhesively held in place by any suitable agglutinant. Between fabric reinforcements 5 is located an intermediate cushioning layer or lamination 6 of more yieldable material, for example, a rubber composition or a mixture having equivalent or corresponding properties; this material preferably being impregnated with a lubricant such as graphite. In order to provide the layer 6 with suitable yieldability and conformability under different conditions, I provide a plurality of unconnected recesses 7 extending into the layer 6 from either face thereof but terminating in the intermediate portion of the layer. Preferably recesses 7 extend into the packing from opposite sides thereof in staggered relation to each other, as shown more particularly in Fig. 2. It is evident that the individual recesses are separated from each other by a considerable amount of the yieldable material of layer 6.

Packing of this type is formed into suitable windings so that the recesses 7 are radially located in relation to the windings and the fabric laminations 5 are at either side of the intermediate layer 6.

Packing of this character may be advantageously formed into a suitable composite strip in a die such as shown in Figs. 5 and 6. This die comprises interfitting members 20 and 21, the former being provided with suitable longitudinal ribs 22 which are adapted closely to interfit with longitudinal grooves 23 in member 21. The portions 22 and 23 of the die members are provided with a series of projections or pins 24 which extend toward the opposite die member, the pins upon each member being staggered in relation to those upon the opposite member. Suitable stops 27 are provided upon one of the members, as the member 20, to limit the movement of the ribs inward into the grooves and to provide spaces within member 21 into which pins 24 extend. It is evident that the fabric and agglutinant, together with the intermediate layer of cushioning material, are located within grooves 23; the die members are brought firmly together; and the material pressed and partially cured while the die members are in interfitting position to provide an elongate strip having the structural characteristics described in reference to the packing shown in Figs. 1, 2 and 3. After the strip is removed from the die members it is formed into windings of any suitable diameter to fit the particular installation.

Packing of this character is used as illustrated in Fig. 1, wherein numeral 10 designates a reciprocating or rotating shaft which is movable in relation to the stuffing box 12 which may be of conventional form and which is recessed to hold a plurality of windings of the packing against the shaft 10. As is evident from an inspection of this figure, each of the fabric layers 5 has one edge portion bearing against the moving shaft, being spaced in the direction of the axis of the shaft by the intermediate cushioning layers 6 which are recessed to provide unconnected openings both upon the faces of the packing which bear upon shaft 10 and upon the opposite faces of the packing. Layers 6 being impregnated with graphite or other lubricating material and the recesses 7 being partially filled with or tending to collect a suitable lubricant, such as oil, the friction between the packing and the moving shaft 10 may be comparatively low.

Packing of the character disclosed herein is adapted to provide a highly satisfactory and long wearing, fluid-tight seal between relatively moving mechanical parts. The laminations which are reinforced with fabric provide the packing with a suitable degree of rigidity and prevent it from being too pliable, while the intermediate cushioning material with its numerous recesses enables the packing properly to conform to the conditions and surroundings to which it is subjected. Extreme changes in temperature are compensated for, due to the yieldable nature of the intermediate lamination 6 and the recesses therein which permit expansion of the packing under heat slightly to reduce the size of the recesses, rather than to force the packing into engagement with the moving shaft under abnormally high pressure which will result in excessive wear of the packing and consequent looseness of the same when the high temperature conditions are removed. Use of self-lubricating material in conjunction with the recesses provides a packing in which lubrication may be provided in a very effective manner, since in addition to the self-lubricating properties of the intermediate packing layer, lubricant may be located and in many cases will naturally collect within the recesses. When large differences in pressure reoccur at frequent intervals at opposite sides of a stuffing box containing packing of this character, the recesses in opposite faces of the packing retard the breathing effect which tends to occur in yieldable packing of this character under such pressure differences. The arrangement of the recesses in separate, unconnected relation to each other and their termination at intermediate portions of the packing, does not increase tendency toward fluid leakage even after the packing has become considerably worn. Furthermore, distribution of the recesses at opposite sides of the packing and at frequent intervals permits the packing to be readily and uniformly conformable to different conditions as well as permitting more efficient lubrication.

I claim:

1. Packing of the class described comprising a winding of yieldable material, recesses upon the inner and outer face of the packing, an intermediate unrecessed portion of the packing lying between said recesses, said recesses being spaced circumferentially from each other and extending into the packing from the opposite faces of the packing in staggered relation to each other.

2. Packing of the class described comprising a winding of laminated material, one lamination thereof being formed of yieldable lubricant-impregnated material, said lamination having a plurality of radially disposed recesses separated by parts of said yieldable material.

3. Packing of the class described, comprising a winding of laminated material, one lamination comprising a yieldable composition, a plurality of unconnected recesses in said lamination, another lamination secured to the first lamination and comprising a fabric layer and an agglutinant.

4. Packing of the class described, comprising a winding of laminated material, one lamination formed of a yieldable composition, a plurality of unconnected recesses in said lamination, said recesses upon opposite faces of the packing being in staggered relation to one another, another lamination secured to the first lamination and comprising a fabric layer and an agglutinant.

5. Packing of the class described, comprising a winding of laminated material, an intermediate lamination of comparatively yieldable material, a plurality of circumferentially spaced, unconnected recesses in said lamination, and outer laminations secured to the intermediate lamination, said outer laminations being substantially less yieldable than that lamination.

6. Packing of the class described, comprising a winding of laminated material, an intermediate lamination of comparatively yieldable material, a plurality of circumferentially spaced unconnected recesses upon opposite faces of said packing and terminating in the mid-portion thereof, and outer laminations secured to the intermediate lamination, said outer laminations being substantially less yieldable than that lamination.

Signed by me at Manville, N. J. this 22nd day of March, 1927.

GEORGE CHRISTENSON.